United States Patent [19]

Bodor et al.

[11] Patent Number: 5,013,573
[45] Date of Patent: May 7, 1991

[54] SPREADS HAVING A GOOD MICROBIOLOGICAL STABILITY AND A FRESH DAIRY TASTE

[75] Inventors: Janos Bodor, Rijswijk, Netherlands; Albert W. Schoenmakers, Dendermonde, Belgium; Walter M. Verhue, Oostvoorne, Netherlands

[73] Assignee: Van den Bergh Foods Co., Division of Conop-Co, Inc., Lisle, Ill.

[21] Appl. No.: 296,388

[22] Filed: Jan. 6, 1989

Related U.S. Application Data

[63] Continuation of Ser. No. 13,496, Feb. 11, 1987, abandoned.

[30] Foreign Application Priority Data

Feb. 19, 1986 [GB] United Kingdom ............... 8604133

[51] Int. Cl.$^5$ .............................................. A23D 7/00
[52] U.S. Cl. ..................................... 426/602; 426/40; 426/585; 426/601; 426/603; 426/613

[58] Field of Search ............... 426/601, 602, 603, 613, 426/585, 40

[56] References Cited

U.S. PATENT DOCUMENTS 4,227,981 10/1980 Williams et al. .

FOREIGN PATENT DOCUMENTS

| 773512 | 12/1967 | Canada . |
| 0157954 | 10/1985 | European Pat. Off. . |
| 1059156 | 2/1967 | United Kingdom . |
| 1445095 | 8/1976 | United Kingdom . |
| 1519044 | 7/1978 | United Kingdom . |
| 2021140A | 11/1979 | United Kingdom . |

Primary Examiner—Donald E. Czaja
Assistant Examiner—D. Workman
Attorney, Agent, or Firm—Gerard J. McGowan, Jr.

[57] ABSTRACT

Spreads having a good microbiological stability and a fresh dairy taste are produced from demineralized, deacidified milk of pH 2.5 to 6.0. The demineralized, deacidified milk is preferably obtained by electrodialysis of fermented milk.

17 Claims, No Drawings

SPREADS HAVING A GOOD MICROBIOLOGICAL STABILITY AND A FRESH DAIRY TASTE

This is a continuation, or application of Ser. No. 013,496, filed Feb. 11, 1987 now abandoned.

BACKGROUND OF THE INVENTION

The present invention relates to spreads having a good microbiological stability, by which term is meant that the spreads have a long shelf life, i.e. 6 weeks or longer at 10° C., without displaying deterioration due to growth of microorganisms.

The present invention particularly relates to oil- and water-containing spreads with a fresh dairy taste, which contain milk protein dispersed or dissolved in an aqueous phase having a pH lower than 6.0 and preferably ranging from 4.0 to 5.8.

A low pH largely contributes to the microbiological stability of the product and is therefore desirable. However, a disadvantage associated with spreads having such low pH's is that they taste sour.

It is therefore an object of the present invention to provide w/o and o/w emulsion spreads which do not taste too acidic although their pH is within the above range.

It is another object of the present invention to provide butter-like spreads, particularly w/o emulsion spreads, which display good flavour release properties and a good stability both at ambient temperatures and at refrigerator temperatures.

SUMMARY OF THE INVENTION

Applicants have found edible, oil- and water-containing spreads meeting the above desiderata. Said spreads are characterized in that they comprise an aqueous phase of a pH lower than 6.0 and preferably ranging from 4.0-5.8, containing a demineralized, deacidified milk or milk product.

By milk or milk product we understand whole milk, skim milk, whey, butter serum or concentrates thereof, including membrane-filtered milk, buttermilk, cream, yoghurt, cheese and quark, which may optionally further contain flavouring agents, e.g. sugar or cocoa, and preservatives.

By demineralization and deacidification we do not necessarily mean that all the acid and all the salt originally present in the starting material are removed, but rather that the milk or milk products are treated such that they contain less than 80% and preferably from 0.5-70% of the original amount of acid and salt. A reduction of 90% or more of the original amount of acid and salt is ideal, but is more time-consuming.

Deacidification/demineralization is carried out for a period of time long enough to obtain a milk or milk product which can be used as the aqueous phase of the emulsions according to the invention, which phase contains less than 40 milliequivalent acid/kg and preferably 1-25 milliequivalent acid/kg.

Demineralization of the milk or milk product is also carried out for a period of time long enough to obtain

| 0-950, | and preferably 0-350 | mg potassium/kg, |
| 0-500, | and preferably 0-150 | mg sodium/kg, |
| 0-720, | and preferably 0-250 | mg calcium/kg, |
| 0-80, | and preferably 0-20 | mg magnesium/kg, |
| 0-800, | and preferably 0-200 | mg chloride/kg, |
| 0-800, | and preferably 0-600 | mg phosphorus/kg |
| | | (organic + inorganic) |
| 0-1000, | and preferably 0-400 | mg citrate/kg and |
| 0-10000, | and preferably 0-2500 | mg lactate/kg. |

Demineralization/deacidification can be carried out by a treatment with ion exchange resins or by electrodialysis.

The demineralized/deacidified milk products according to the invention are preferably obtained by electrodialysis using, for instance, an apparatus marketed by SRTI (Société de Recherches Techniques et Industrielles France) or by IONICS (U.S.A.).

Useful ion-exchange membranes include cationic membranes of the styrene divinyl benzene and styrene butadiene types carrying a sulphonic group as the ion-exchange group and anionic membranes of the same types, but carrying quaternary ammonium groups. Such membranes are, for instance, those marketed by Morinaga and Asahi Chemical.

Electrodialysis is generally carried out at a temperature ranging from 0-35° C. The higher temperatures contribute to a less time-consuming process, whereas the lower temperatures help avoiding coagulation of the protein, bacteriological problems and clogging of the membranes. Electrodialysis is therefore preferably carried out between 0 and 20° C. and ideally between 5 and 15° C.

Applicants have found it very appropriate to homogenize the milk product prior to the demineralization treatment, in order to achieve a better dispersion/solubilization of the protein and to avoid clogging of the membranes.

Homogenization is preferably carried out under pressure, for instance at 100-200 bars.

The edible spreads according to the invention preferably comprise an aqueous phase containing deacidified, demineralized, biologically soured milk or milk product, since such greatly contributes to butter-likeness, a fine precipitate of the protein, generation of antimicrobial factors and a reduction of the lactose content resulting in a reduced sweetness.

The aqueous phase of the emulsions of the present invention are obtainable according to a process comprising in its most general form:

(1) acidifying milk or a milk product from whole milk, skim milk, whey, buttermilk and butter serum or concentrates thereof by applying bacteriological souring and/or by adding an acid or an acid-generating substance, such as glucono delta-lactone to achieve a pH lower than 5.8 and preferably ranging from 2.5-5.5; and (2) subjecting the acidified milk product to a demineralization/deacidification treatment to obtain a product having a pH lower than 5.8 and preferably ranging from 4.0-5.8 and containing less than 40 meq acid/kg.

More specifically, there are two ways of performing the process outlined above.

A first method comprises:

(1) acidifying milk or a milk product with an acid or an acid-generating substance to achieve a pH below 5.5, (2) subjecting the acidified milk or milk product to a demineralization/deacidification treatment, (3) if necessary, adding an alkaline substance to raise the pH to a value above 5.5 and preferably to a value ranging from 5.8-6.8, and, if necessary, pasteurizing the mixture, (4) achieving bacteriological souring of the mixture.

The advantage associated with this method lies in the excellent texture of the products obtained according to this method. A second method comprises:

A second method comprises:

(1) bacteriologically souring milk or a milk product and subsequently (2) subjecting the bacteriologically soured milk or milk product to a demineralization/deacidification treatment.

Bacteriological souring is preferably carried out with a culture selected from *Streptococcus lactis, Streptococcus cremoris, Streptococcus diacetyllactis, Leuconostoc cremoris, Leuconostoc mesenteroides, Streptococcus citrophilus, Streptococcus thermophilus, Lactobacillus bulgaricus, Lactobacillus acidophilus, Bifidobacterium bifidus, Bifidobacterium infantis, Lactobacillus helveticus, Lactobacillus casei* and *Propionibacterium shermanii.*

The preferred cultures consist of *Streptococcus diacetyllactis, Leuconostoc cremoris, Streptococcus cremoris* or of mixtures thereof, which generate a high amount of diacetyl. Preferred spreads comprise an aqueous phase containing 0.1-150 mg/kg, preferably 1-40 mg/kg diacetyl.

Applicants have also found that it is very useful, during or after the bacteriological souring, to aerate, preferably under pressure, the milk or milk product in order to increase the level of diacetyl.

Another way of achieving this consists in heating the mixture to a temperature ranging from e.g. 50-90° C.

Still another way of achieving a high level of acetyl consists in fermenting the mixture and optionally adding an extra amount of acid, e.g. lactic acid, hydrochloric acid or citric acid, to achieve a pH ranging from 1.0 to 4.5 and preferably from 2.0 to 3.0.

Such treatment can be combined with a subsequent aeration or a heat treatment or with both aeration and a heat treatment.

Such treatments for enhancing diacetyl production turned out to be extremely useful in avoiding losses of diacetyl during electrodialysis, ultimately leading to loss of flavour.

The demineralized, deacidified milk products produced as described above can be further concentrated by evaporation, reverse osmosis, ultrafiltration, heating between 35 and 85° C., isoelectric precipitation followed by separation or filtration, or combinations of these techniques, to obtain cheese, quark, etc., which can be used as components of the dispersed aqueous phase of the w/o emulsion spreads of the present invention.

DETAILED DESCRIPTION OF THE INVENTION

The aqueous phase of the edible spreads according to the invention may contain viscosity-increasing agents, such as thickening agents and gelling agents, for instance CMC, guar gum, carragheenan, locust bean gum, xanthan gum, starch and gelatin.

Such substances improve the stability and texture of the product during storage at ambient temperature and at refrigerator temperature.

The preferred gelling agent consists of gelatin, starch or mixtures thereof, which impart stability during storage and spreading of the spread and enhance release of flavours during consumption particularly of w/o emulsion spreads since they contribute to coarsening the dispersed aqueous phase and to breaking of the emulsion on consumption.

The starch is preferably selected from the group consisting of rice starch, oat starch, corn starch, wheat starch, di-starch phosphate, acetylated di-starch adipate, hydroxypropyl di-starch phosphate and acetylated di-starch phosphate.

Suitable concentrations of gelatin range from 0.5-5%, preferably from 1 to 3%.

Suitable concentrations of starch range from 1-5%, preferably from 1.5-4% by weight, based on the total spread.

It is envisaged that the emulsions should be produced by emulsification of the aqueous phase with a fat phase in a way known per se, for instance by such methods as are described in Chapter 3 of "Margarines", by A. Anderson and P. Williams, 2nd revised edition, Pergamon Press, London, 1965.

The fat phase can comprise vegetable fats and animal fats. Such fats can be hydrogenated, interesterified or fractionated.

For organoleptic and economic reasons, mixtures of vegetable fats and butter fat are preferred.

Vegetable fats may comprise maise oil, soybean oil, rapeseed oil, sunflower oil, palm oil, coconut oil, palmkernel oil, babassu oil, in their natural form or in randomized or fractionated form.

The most appropriate mixture of fats will depend on the nature of the final product aimed at. Very suitable plastic fat blends for spreads of the margarine and reduced fat products with a level of fat ranging from 20-90%, preferably 30-65%, can be found in the above reference book, "Margarines".

The invention will now be illustrated in the following Examples.

EXAMPLE 1

Milk was pasteurized for 5 minutes at 90° C. and was subsequently cooled to 20° C.

The milk was innoculated with a commercially available culture containing *Streptococcus diacetyllactis, Leuconostoc cremoris* and *Streptococcus cremoris* and fermented overnight to obtain soured skim milk of pH=4.50.

The fermented milk was subsequently homogenized at 150 bars.

The fermented milk was electrodialysed in an AQUALIZER PIO produced and marketed by SRTI (FRANCE), equipped with 30 cell pairs anionic and cationic membranes (type Selemion from ASAHI, Japan).

Electrodialysis was carried out for one hour at 30° C. at a voltage of 1.5 V per cell pair. Samples were taken to check acidity, conductivity and diacetyl content. After one hour the conductivity had decreased from about 1.8 mS to about 0.04 mS. The pH decreased slightly to 4.4. Titration of the milk to neutrality, using sodium hydroxide, indicated that the titratable acid content decreased from about 81 milliequivalent/kg to about 24 milliequivalent/kg.

The product contained after electrodialysis about 2.5 mg/kg diacetyl.

Analysis of the milk product before and after electrodialysis revealed the following composition:

| before | after |
| --- | --- |
| 1267 mg K/kg | 7 mg K/kg |
| 362 mg Na/kg | 12 mg Na/kg |
| 923 mg Ca/kg | 2 mg Ca/kg |
| 120 mg Mg/kg | 15 mg Mg/kg |
| 1000 mg Cl$^-$/kg | 50 mg Cl$^-$/kg |
| 900 mg P/kg | 300 mg P/kg* |
| 300 mg citrate/kg | 100 mg citrate/kg |
| 8400 mg lactate/kg | 120 mg lactate/kg |

(*total of organic + inorganic phosphorus)

A reduced fat, w/o emulsion spread of the following composition was produced:

| | % by weight |
| --- | --- |
| Fat phase | |
| Butterfat | 20 |
| Vegetable fat* | 20 |
| Lecithin | 0.1 |
| Beta-carotene | 0.15 |
| Monoglyceride | 0.2 |
| Aqueous phase (pH 4.7) | |
| Salt | 0.35 |
| Potassium sorbate | 0.13 |
| Gelatin | 2.0 |
| Rice starch | 2.5 |

Electrodialysed cultured milk (q.s.p) up to 100%.

The spread was produced by emulsification of the aqueous phase and the fat phase in a Votator ® in the conventional way. The vegetable fat consisted of a 20/80 mixture of palm oil hydrogenated to a melting point of 43° C. and soybean oil

EXAMPLE 2

Example 1 was repeated, using buttermilk as the starting material. The procedure was identical with that of Example 1, though the fermented milk was aerated by vigorously stirring it for 2 hours and was subsequently homogenized at 100 bars.

During 1 hour electrodialysis the electric conductivity decreased from 1.7 mS to 0.13 mS. The pH increased from 4.5 to 4.6. The titratable (to neutrality) amount of acid decreased from about 88 milliequivalent/kg to about 23 milliequivalent/kg. The amount of lactic acid decreased from 7500 mg/kg to 100 mg/kg.

The diacetyl content before and after electrodialysis was about 5.0 mg/kg. Analysis of the electrodialysed buttermilk revealed the following composition:

| Calcium | 2 | mg/kg |
| --- | --- | --- |
| Magnesium | 32 | mg/kg |
| Potassium | 8.4 | mg/kg |
| Sodium | 3.2 | mg/kg |
| Phosphorus (organic + inorganic) | 400 | mg/kg |
| Citrate | 0 | mg/kg |
| Chloride | 50 | mg/kg |

A reduced fat spread of the same composition as in Example 1 was produced, except that electrodialysed cultured buttermilk was used instead of electrodialysed cultured milk.

The results of the panel were as satisfactory as in the case of Example 1.

EXAMPLE 3

Example 1 was repeated to produce a margarine.

The composition of the margarine was:

| | % by weight |
| --- | --- |
| Fat phase | |
| Butterfat | 40 |
| Vegetable fat | 40 |
| Lecithin | 0.1 |
| Beta-carotene | 0.15 |
| Monoglyceride | 0.2 |
| Aqueous phase (pH 4.7) | |
| Salt | 0.35 |
| Potassium sorbate | 0.13 |

Electrodialysed cultured milk (q.s.p) up to 100%.
The results of the panel were very satisfactory.

EXAMPLE 4

The electrodialysed, soured milk pH 4.4 of Example 1 was slowly heated to about 35° C. and the coagulate was subsequently heated at 55° C. and filtrated to obtain a cheese resembling cottage cheese.

This cottage cheese was mixed with butter (weight ratio 70/30) in a Hobart mixer to obtain a spread.

The spread was given to a panel of consumers who judged the flavour of the product. The flavour of the product was found very satisfactory, free of acidic taste.

EXAMPLE 5

Dairy cream (39% fat) acidified with 1N HCl to pH 5.2 was treated with a mixture of cationic and anionic ion exchange resins (100 g/kg cationic ion exchange resin (H$^+$form) type AG 50W-X8 (ex BIO-RAD), 120 g/kg anionic ion exchange resin (OH$^-$form) type AG 2-X8 (ex BIO-RAD) at 35° C. for 10 minutes). The ion exchange resins were separated via a sieve and the cooled cream was inoculated with a commercially available sour cream culture of the type used in Example 4.

Ripening took place at 12° C. for 16 hours. The resulting sour cream had a pH of 4.50.

The cream was worked to obtain butter using a continuous churn apparatus, resulting in a butter with pH 4.5 having very mild non-acidic taste. The shelf stability of the product was excellent.

We claim:
1. An edible, oil- and water-containing emulsion spread comprising a fat phase and an aqueous phase of a pH lower than 6.0, which aqueous phase comprises less than 40 milliequivalents acid/kg, diacetyl at a level of 1–40 mg/kg, calcium at a level of –720 mg/kg, magnesium at a level of 0–20 mg/kg, said aqueous phase being the product obtained by:
   (a) souring milk or a milk product with a bacterial culture productive of diacetyl or precursors thereof, and
   (b) electrodialyzing the milk or milk product to remove minerals and acid therefrom.
2.
3. Edible spread according to claim 1, wherein the pH of the aqueous phase ranges from 4.0 to 5.8.
4. Edible spread according to claim 1, wherein the aqueous phase contains 1 to 25 milliequivalent acid/kg.
5. Edible spread according to claim 1, wherein the aqueous phase contains a demineralized, deacidified milk or milk product containing less than 80% of acid and salt present prior to demineralization and deacidification.

6. Edible spread according to claim 1, wherein the aqueous phase contains no more than:

| | |
|---|---|
| 350 | mg potassium/kg, |
| 150 | mg sodium/kg, |
| 250 | mg calcium/kg, |
| 20 | mg magnesium/kg, |
| 200 | mg chloride/kg, |
| 600 | mg phosphorus/kg (organic + inorganic) |
| 400 | mg citrate/kg, and |
| 2500 | mg lactate/kg. |

7. The edible oil- and water-containing spread according to claim 1, wherein the milk or milk product has been subjected to souring with a bacterial culture selected from *Streptococcus lactis*, *Streptococcus diacetyllactis*, *Streptococcus cremoris*, *Streptococcus aromaticus*, *Streptococcus citrophilus*, *Betacoccus cremoris*, *Leuconostoc citrovorum*, *Leuconostoc cremoris*, *Lactobacillus helviticus*, *Lactobacillus casei* and *Propionibacterium shermanii*.

8. Edible spread according to claim 7, wherein the milk or milk product which is to be demineralized and deacidified has been bacteriologically soured with a mixture of *Streptococcus cremoris*.

9. Edible spread according to claim 7, wherein the aqueous phase contains diacetyl at a level ranging from 1-40 mg/kg.

10. Edible spread according to claim 1, wherein the aqueous phase contains a component selected from the group consisting of a thickening agent, a gelling agent and a mixture of both gelling and thickening agent.

11. Edible spread according to claim 10, wherein the aqueous phase contains gelatin.

12. Edible spread according to claim 10, wherein the aqueous phase contains non-crystalline hydrated starch 13. Edible spread according to claim 12, wherein the starch is selected from the group consisting of rice starch, oat starch, corn starch, wheat starch, di-starch phosphate, acetylated di-starch adipate, hydroxypropyl di-starch phosphate and acetylated di-starch phosphate.

14. Edible spread according to claim 1 wherein the aqueous phase constitutes 10-80% by weight of the total spread and the fat phase constitutes 20-90% by weight of the total spread.

15. Edible spread according to claim 1, wherein the fat phase contains butterfat.

16. Edible spread according to claim 1, wherein the spread is a water-in-oil emulsion.

17. The spread according to claim 5, wherein the acid and salt in the aqueous phase constitute 0.5 to 70% of the amount present in the corresponding non-demineralized milk or milk product.

* * * * *

UNITED STATES PATENT AND TRADEMARK OFFICE
CERTIFICATE OF CORRECTION

PATENT NO. : 5,013,573
DATED : May 7, 1991
INVENTOR(S) : Bodor et al.

It is certified that error appears in the above—identified patent and that said Letters Patent is hereby corrected as shown below:

On The Title Page: Item [73] second line, replace "Conop-Co" with --Conopco--.

Signed and Sealed this

Thirteenth Day of October, 1992

*Attest:*

DOUGLAS B. COMER

*Attesting Officer*     *Acting Commissioner of Patents and Trademarks*